May 31, 1932.           C. E. MUELLER           1,861,353
           DEVICE FOR DESTROYING MITES ON FOWLS
                    Filed Nov. 29, 1929
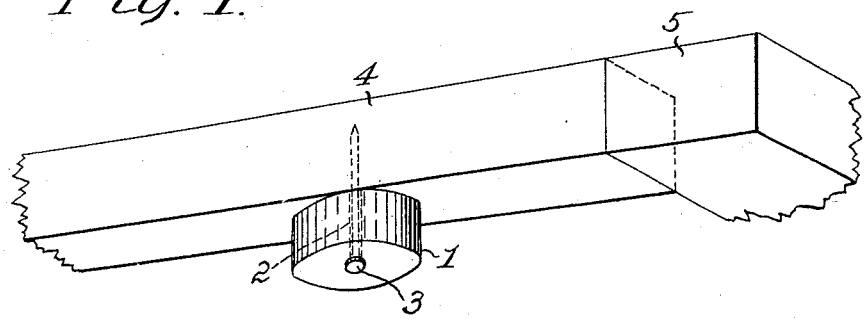
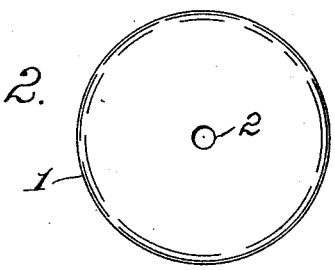
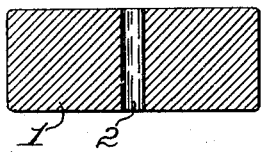
INVENTOR
Charles E. Mueller,
BY G. C. Kennedy
ATTORNEY Patented May 31, 1932

1,861,353

UNITED STATES PATENT OFFICE

CHARLES E. MUELLER, OF CEDAR RAPIDS, IOWA

DEVICE FOR DESTROYING MITES ON FOWLS

Application filed November 29, 1929. Serial No. 410,450.

My invention relates to devices for destroying mites on fowls, and the object of my improvement in such devices is to furnish means mounted on a roost in an effective manner, which include a body composed of deodorizing, disinfecting and especially insecticidal substances capable of emitting a vapor such as will destroy mites, lice or other vermin such as annoy domestic fowls while roosting.

This object I have accomplished by the means which is hereinafter described and claimed, and which is illustrated in the accompanying drawings, in which Fig. 1 is a perspective view of a lower face of a roost bar and its supporting means, fragmental, and showing the attached body thereon which by its volatile vapors of a lethal effect on vermin is adapted in location and constitution for its purpose. Figs. 2 and 3 are full size views of said body, Fig. 2 being an end plan, and Fig. 3 a central diametral section thereof.

I have shown to exemplify the invention, the body 1 as a short solid cylinder, having a central hole 2 therethrough. However, the shape of the outer periphery of the body 1 is immaterial, as it may be of any form desired, and consistent with its use or in being such as allows its material to remain unitary under ordinary conditions or shocks, without falling apart because of some friability.

The body 1 is to be shaped from one or more ingredients which possess characteristics as to deodorizing, disinfecting and insecticidal, and which also emit under moderate temperatures a volatile vapor which will penetrate the feathers of a hen or other fowl roosting on a roost bar 4, the latter supported on an end beam 5, and which vapor destroys mites, lice or other infecting insects without injury to the fowl.

As the body 1 is made up of a substance or substances in combination which are somewhat friable, I have provided the body with the central hole to receive therethrough a headed nail 3 driven thence into the roost bar 1 without liability of fracture of the body during nailing. The body 1 is preferably mounted upon the lower face of the bar 4, being more out of the way of the roosting fowl, without preventing the emission of the volatile lethal vapor.

The body 1 may be shaped from one or more ingredients, such as cresylic acid, naphthalene or paradichlorobenzinol, or other materials having volatile emissions of an insecticidal kind.

Having described my invention, what I claim as new, and desire to secure by Letters Patent, is:

The combination with a roost-bar, of an apertured cylindrical body containing repellently odoriferous disinfecting material, mounted upon the under face of the bar and not wider than the bar transversely, and a headed nail traversing the aperture of said body and fixed in said bar to retain the body in contact therewith.

In testimony whereof I affix my signature.

CHARLES E. MUELLER.